United States Patent

[11] 3,583,725

[72] Inventor Timothy Selwyn Fry
 Stoke, England
[21] Appl. No. 869,466
[22] Filed Oct. 27, 1969
[45] Patented June 8, 1971
[73] Assignee Rootes Motors Limited
 London, England

[54] SUSPENSION SYSTEMS FOR MOTOR VEHICLES
 9 Claims, 3 Drawing Figs.
[52] U.S. Cl. .................................................. 280/124
[51] Int. Cl. .................................................. B60g 9/00
[50] Field of Search ........................................ 280/124;
 267/15, 20

[56] References Cited
UNITED STATES PATENTS

| | | | |
|---|---|---|---|
| 2,757,017 | 7/1956 | Matthias et al. | 280/124 |
| 2,768,002 | 10/1956 | Rabe et al. | 280/124 |
| 3,332,702 | 7/1967 | Rosenkrands | 280/124 |

Primary Examiner—Milton Buchler
Assistant Examiner—Carl A. Rutledge
Attorney—Mawhinney & Mawhinney ABSTRACT: A suspension system for a motor vehicle comprises two trailing arms pivoted at their front ends to the body of the vehicle, and having wheels mounted at the rear ends of the arms. Each arm is located by and forms a rigid triangular structure with a transverse link and a diagonal link and the inner ends of the structures are attached to the vehicle body. Springs are provided to resist upward movement of the rear ends of the arms.

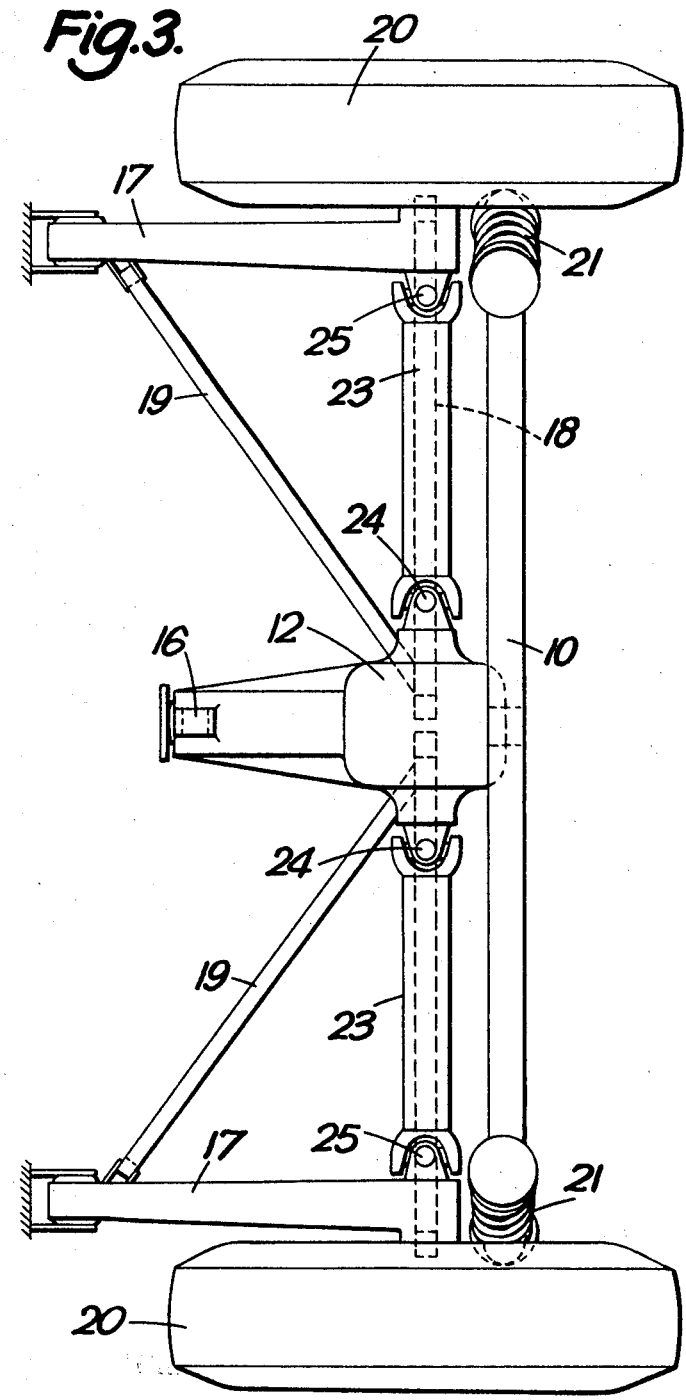

SUSPENSION SYSTEMS FOR MOTOR VEHICLES

The invention relates to a suspension system for a motor vehicle and more particularly but not exclusively to a rear wheel suspension system.

The invention provides a motor vehicle having a spring suspension system consisting of at each side of the vehicle a trailing arm, means to pivotally connect the front end of the arm to the vehicle body, a mounting for a wheel at the rear end of the arm, a transverse link, means to attach the outer end of the transverse link to the rear end of the trailing arm, a diagonal link, means to connect the diagonal arm to the trailing arm and to the transverse link to complete therewith a rigid (e.g. pin-jointed) structure, means to pivotally attach to the vehicle body the inner ends of the transverse links of the two structures one at each side of the vehicle so that the wheel carrying corner of each triangle can pivot up and down about an axis joining the pivot of the trailing arm to the body and the pivotal mounting of the inner end of the transverse link, and spring means to resist such upward movement of the wheel carrying corners.

The system may be modified in that the triangular structures are connected together by the two diagonal links being pivotally connected together, the transverse links being connected to the diagonal links respectively, the pivotal connection between the two triangular structures being connected (e.g. resiliently) to the vehicle body.

A specific embodiment of a rear wheel suspension system which will now be described with reference to the accompanying diagrammatic drawings in which:

FIG. 3 is a plan view of the system.

Figure 1:
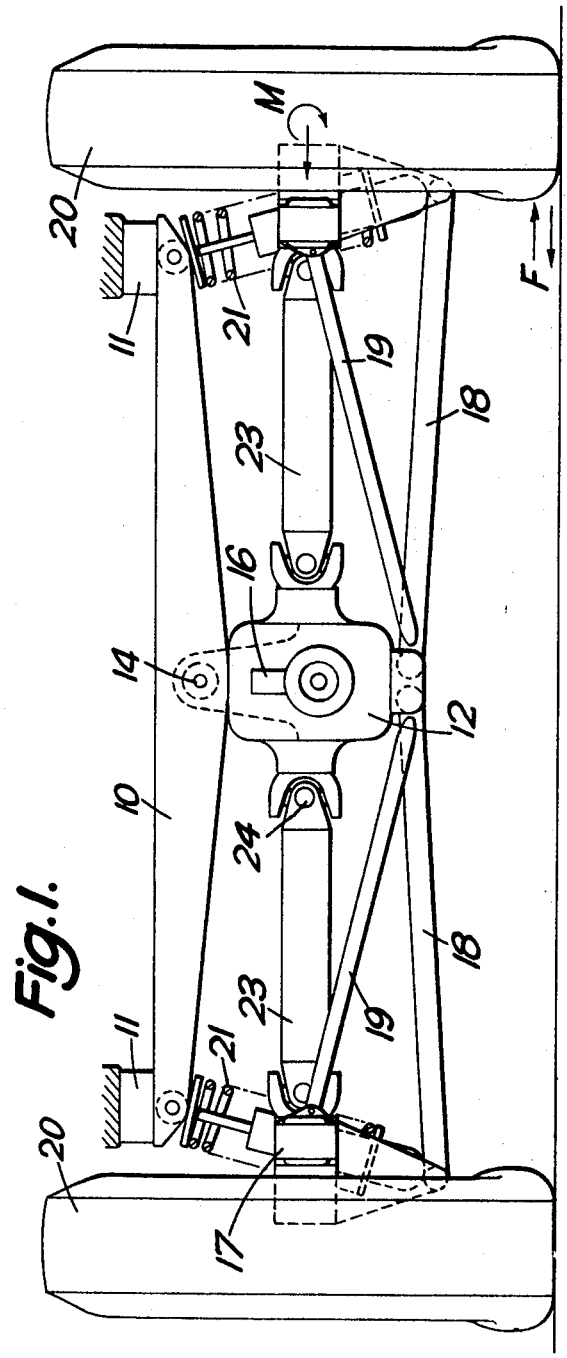
FIG. 1 is a front view of the system.

A beam 10 is slung underneath the chassis of a vehicle at the rear end of the vehicle. The beam is attached to the chassis by means of rubber blocks 11. A final drive housing 12 is attached to the beam 10 by means of a pivot 14 or a resilient mounting at the rear end of the housing and the front end of the housing is attached to the chassis by means of a bracket 15 which is resiliently attached to an ear 16 upstanding from the front of the housing.

Figure 2:
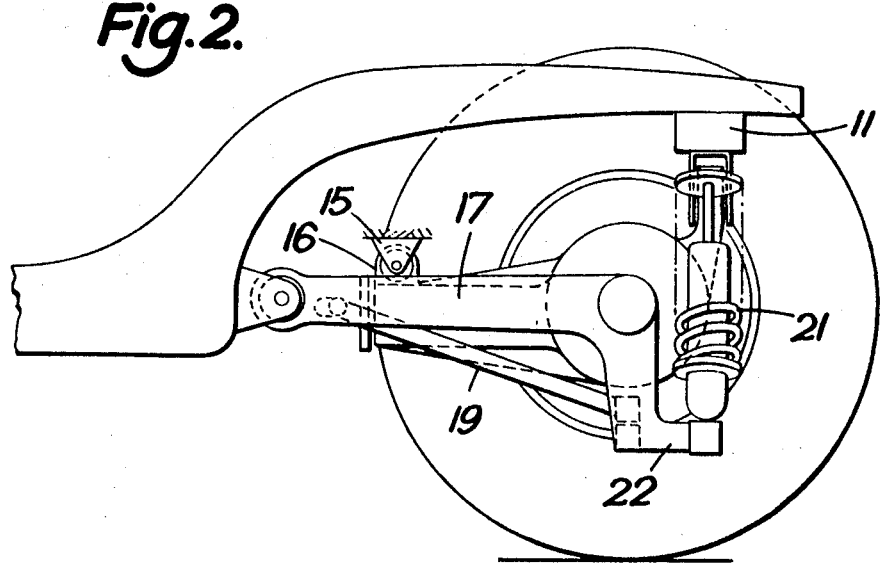
FIG. 2 is a side view of the system.

A rigid triangular structure is formed of a trailing link 17 which is generally L-shaped as viewed in FIG. 2, a transverse link 18 and a diagonal link 19. The diagonal link 19 is pivotally attached at one end to the link 17 and is attached at the other end to the link 18 preferably by a rigid attachment although a pivoted attachment would be satisfactory. The link 18 is pivotally attached at one end to the trailing link 17 and is pivotally attached at the other end to the final drive housing 12.

The free end of the link 17 also constitutes a hub for a rear wheel 20 for the vehicle and there is a coil spring 21 which is attached to an abutment 22 on the link 17 and the beam 10 below the block 11.

The wheel 20 is driven by means of a half-shaft 23 which is connected to the final drive housing and to the wheel by universal joints 24 and 25 respectively. The half-shaft 23 is of robust construction and is arranged to take loads in compression and tension. The shaft 23 forms an integral part of the suspension system and with the link 18 determines the camber of the wheel 20.

It is desirable that the pivot 14 is above the center of gravity of the final drive to cut down the load on the attachment 15.

The arrangement of the suspension for the other rear wheel 20 is exactly the same as the suspension for the rear wheel 20 and will not be described further.

The diagonal link 19 together with the links 17 and 18 form a rigid triangular structure. The structure is pivoted about a line passing through the pivotal connections of the links 17 and 18 to the vehicle body and final drive housing respectively i.e. substantially parallel to the link 19. It has been found that when the diagonal link 19 is omitted the transverse link 18 transmits high thrusts into the final drive housing under cornering loads so that the final drive housing must have transversely spaced apart fairly stiff resilient mountings to resist the high thrusts. Such stiff resilient mountings feed road and transmission vibrations into the vehicle chassis. When the diagonal link 19 is present the transverse thrusts due to cornering are absorbed in the resulting triangular structure and consequently the need for relatively hard spaced apart mountings is obviated. In the embodiment shown the mountings are relatively soft and are predominantly of a suspensory nature.

Although in the specific embodiment just described the drive shafts 23 are shown as providing a link in the suspension system it will be appreciated that the drive shafts need not have this function. For example it would be possible to provide two triangulated structures each being constructed in a similar manner to the triangulated structures described above. One of the triangulated structures would be arranged above the other and the drive shaft would then be subjected to change in length as the wheel rises and falls.

A number of other modifications are also within the scope of the invention. For example, if the final drive unit were connected to the gear box by a torque tube the mounting 15 could then be removed.

Another modification would be to pivotally connect the links 19 to the housing 12 instead of to the links 18.

Also the triangular structures may be connected together by the two diagonal links 19 being pivotally connected together and to the vehicle body in which case the transverse links would be connected to the diagonal links.

The invention may also be applied to a front suspension. Where an engine or transaxle is accommodated the beam 10 may be U-shaped and the links 18 and 19 may be pivoted to it, the engine mountings being carried by the U-shaped beam.

It will be appreciated that the diagonal links 19 can be applied to any link suspension system which has one link substantially longitudinal forming a trailing arm and another substantially lateral, giving the same advantages as the system shown (i.e. MacPherson type or ordinary double wishbone).

I claim:

1. A motor vehicle having a spring suspension system consisting of;
   a. at each side of the vehicle a trailing arm;
   b. means to pivotally connect the front end of the arm to the vehicle body;
   c. a mounting for a wheel at the rear end of the arm;
   d. a transverse link;
   e. means to attach the outer end of the transverse link to the rear end of the trailing arm;
   f. a diagonal link;
   g. means to connect the diagonal arm to the trailing arm and to the transverse link to complete therewith a rigid (e.g. pin-jointed) structure;
   h. means to pivotally attach to the vehicle body the inner ends of the transverse links of the two structures one at each side of the vehicle so that the wheel carrying corner of each triangle can pivot up and down about an axis joining the pivot of the trailing arm to the body and the pivotal mounting of the inner end of the transverse link; and
   i. spring means to resist such upward movement of the wheel carrying corners.

2. The modification of the vehicle claimed in claim 1 in which the triangular structures are connected together by means to pivotally connect together the two diagonal links, the transverse links being connected to the diagonal links respectively, and means to connect the pivotal connection between the two triangular structures to the vehicle body.

3. A vehicle as claimed in claim 1 having a housing which is mounted on the vehicle body and there is means to pivotally connect the two triangular structures to the housing.

4. A vehicle as claimed in claim 3 in which there are half shafts extending between the housing and the wheel mountings which shafts are mounted above the transverse links and form with the transverse links and the wheel mountings pin jointed structures which determine the camber of the wheels.

5. A vehicle as claimed in claim 3 in which there is a beam extending across the vehicle body and there is means to resiliently attach the differential housing to the beam.

6. A vehicle as claimed in claim 5 in which the spring means are coil springs acting between the corners of the triangular structures and the beam.

7. A vehicle as claimed in claim 1 in which the diagonal links are substantially parallel to the pivotal axes of the triangular structures respectively.

8. A vehicle as claimed in claim 1 in which the diagonal link is rigidly attached to the transverse link.

9. A vehicle as claimed in claim 1 in which the diagonal link is pivotally attached to the trailing arm.